Sept. 26, 1961 W. S. RENIER 3,001,234
INJECTION MOLDING MACHINE
Filed July 23, 1959 5 Sheets-Sheet 1

INVENTOR.
WILLIAM S. RENIER
BY
ATTORNEYS

Sept. 26, 1961 W. S. RENIER 3,001,234
INJECTION MOLDING MACHINE
Filed July 23, 1959 5 Sheets-Sheet 2

INVENTOR.
WILLIAM S. RENIER
BY
ATTORNEYS

INVENTOR.
WILLIAM S. RENIER
BY
ATTORNEYS

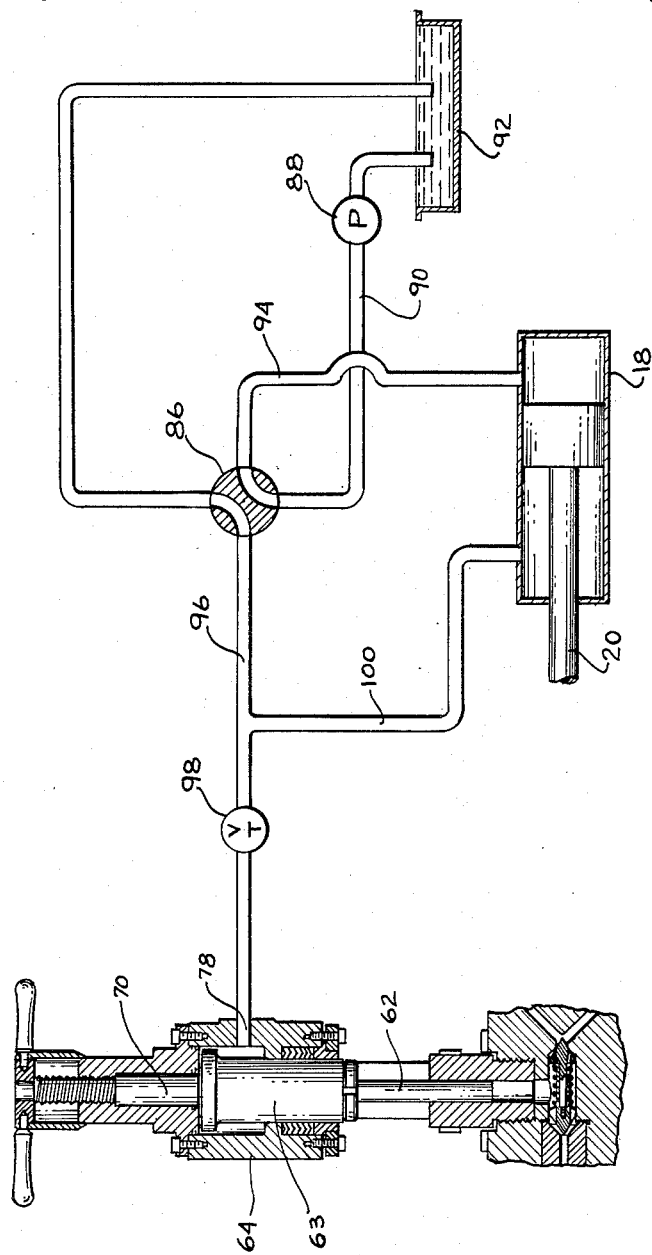

United States Patent Office 3,001,234
Patented Sept. 26, 1961

3,001,234
INJECTION MOLDING MACHINE
William S. Renier, Bay Village, Ohio, assignor to Baldwin-Lima-Hamilton Corporation, Hamilton, Ohio, a corporation of Pennsylvania
Filed July 23, 1959, Ser. No. 829,072
6 Claims. (Cl. 18—30)

This invention relates to machines for the injection molding of thermoplastic materials, such as polystyrenes and polyethylenes.

In the conventional injection molding machine, a charge of granular molding material is dropped into a space ahead of a heated chamber or cylinder and is forced therethrough by the application of a very high hydraulic pressure on an injection plunger. The material is plasticized in the cylinder and delivered to the mold where it is held under pressure for a period of time sufficient to allow the molded part to cool. The very high pressures on the injection plunger are thus transmitted directly to the mold and require that the clamping pressures holding the mold halves closed be also very high, if flash at the mold parting line and movement of the mold halves is to be prevented. Since the injection plunger must operate on all of the material in the heated injection cylinder, enough for several shots, these machines have been found to have many disadvantages which can be overcome.

The art has proposed the use of so-called "preplasticizing" machines in which the molding material is brought from its granular to a semi-fluid state in one cylinder and collected in and injected from a separate heated cylinder by a separate injection plunger. The pre-plasticizing machines previously proposed make it possible to inject at a somewhat lower pressure and are more efficient than the older conventional machines, but are still plagued with many of its disadvantages. The fluid molding material has a marked tendency to leak out of the injection cylinder along valve stems or along the plunger side walls, and this leakage has been accepted as a necessary evil. The principal disadvantage of leakage is not only the loss of material, which may be quite small, but the fact that such leakage makes it virtually impossible to predetermine the quantity of material injected at each shot. The usual practice, then, is to inject from a cylinder having a greater capacity than the mold, and to hold the pressure on the injection plunger during cooling much as in the operation of conventional machines.

The primary object of the present invention is to provide an injection molding machine of the "pre-plasticizing" type which is so constructed that a precise and known quantity of material is segregated in an injection cylinder and injected at each shot. In the present invention, this is made possible by the elimination of leakage and of externally operated valves as will become apparent.

Another object of the invention is to provide a valve for controlling the passage of plasticized molding material from a plasticizing cylinder into an injection cylinder and from said injection cylinder into a mold, said valve being completely automatic in its operation, and deriving its forces for operation from the plasticized material itself.

Machines either of the conventional type or of the pre-plasticizing type that require high and continuing injection pressures cannot usually mold a part to its exact theoretical weight. The theoretical weight may be defined as the weight of the volume of uncompressed material required only to fill the mold when completely closed. In general, a clamping pressure of from 2½ to 5 tons per inch of projected area of the mold cavity is required to hold the mold closed sufficiently to prevent flashing at the parting line, but flashing occurs only when the mold halves have moved a substantial distance apart. For example, with most molding materials the halves may separate as much as .010 inch without permitting the material to flow out as flash. In such a situation the part as molded will contain more than the theoretical weight of material, and an overweight of from 5 percent to 25 percent, depending on the part, has been accepted in the industry as almost unavoidable. In extreme cases such as would exist in a molded wall tile having a designed thickness of .030 inch, opening of the mold by only .0075 inch will cause the pieces to be 25 percent overweight. Since the cost of the raw material represents a very substantial part of the cost of the finished product, the loss occasioned by the overweight may be a serious commercial factor. The present invention makes it possible to avoid the molding of overweight parts by providing means to meter with great precision the volume of material to be injected at each shot, and to inject only the metered quantity. Thus the clamping force on the mold halves may be greatly reduced (by as much as 50 percent or 60 percent) without danger of flashing and the machine itself can be less massive for a given range of mold capacities.

Molding to the theoretical weight of the part has also been found to reduce drastically or to completely eliminate internal stresses that are usually caused by holding a high pressure on the part during cooling.

In known machines the fluid plastic material is frequently subject to localized overheating and chemical breakdown, sometimes by reason of a tendency to stratify in the smooth passages provided for its transit between the injection and plasticizing cylinders and the mold, which results in the outer layers of the stream attaining a higher temperature than the inner layers, and sometimes by reason of the re-entry into the stream of small masses of material that have been lodged in recesses or passages leading to the outside, or have been trapped in a heated condition for an excessive length of time. Such overheated and partially burned material causes discoloration of parts in which it may eventually be included. To overcome this disadvantage, the present invention provides means to cause a thorough mixing of the fluid material prior to its entry into the mold, and so arranges the parts that all surfaces on which the fluid material might stagnate or collect are thoroughly washed at each cycle.

In the machine of the present invention the hydraulic forces on the charging plunger and those on the injection plunger are, in the preferred form, controlled by a single four-way valve so that the relief of pressure against one plunger and the application of pressure to another may be accomplished instantaneously and by a simple and efficient mechanism.

Other objects and advantages of the invention will become apparent from the following description of a preferred embodiment thereof, reference being had to the accompanying drawings, in which—

FIG. 7 is a diagrammatic disclosure of a hydraulic circuit for applying pressures to various of the machine elements.

Briefly the apparatus of the present invention comprises an injection molding machine having a plasticizing cylinder in which material is brought from a granular to a fluid state, communicating with an injection cylinder through a valved passage, said injection cylinder being of precisely adjustable capacity, together with an automatically actuated valve which is responsive to the flow and pressures on the material for controlling the passage of material from the plasticizing cylinder into the injection cylinder and from the injection cylinder into the mold.

In its method aspects, the present invention comprises the steps of plasticizing a molding compound, segregating a precisely pre-selected quantity of said plasticized compound, and injecting said pre-selected quantity of compound into a mold.

Figure 1:
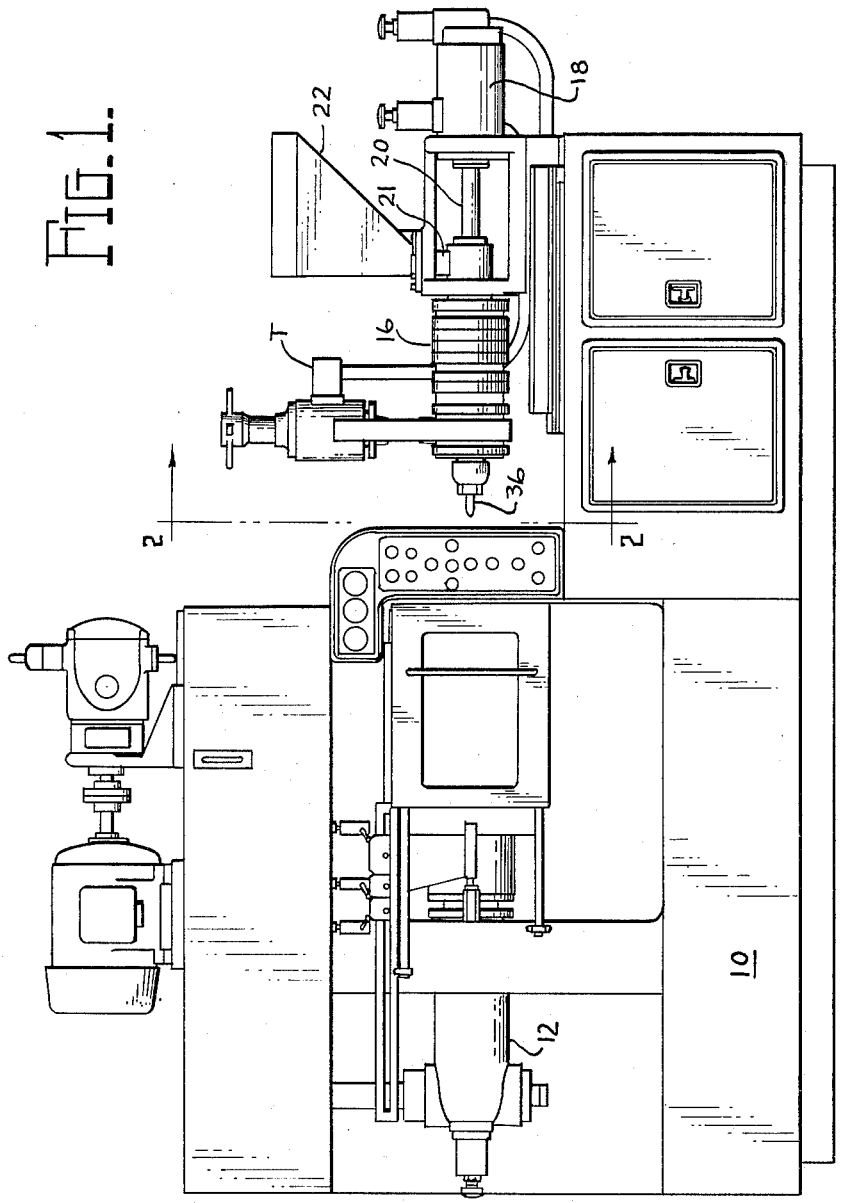
FIG. 1 is a diagrammatic side elevational view of an injection molding machine embodying the present invention.
Figure 2:
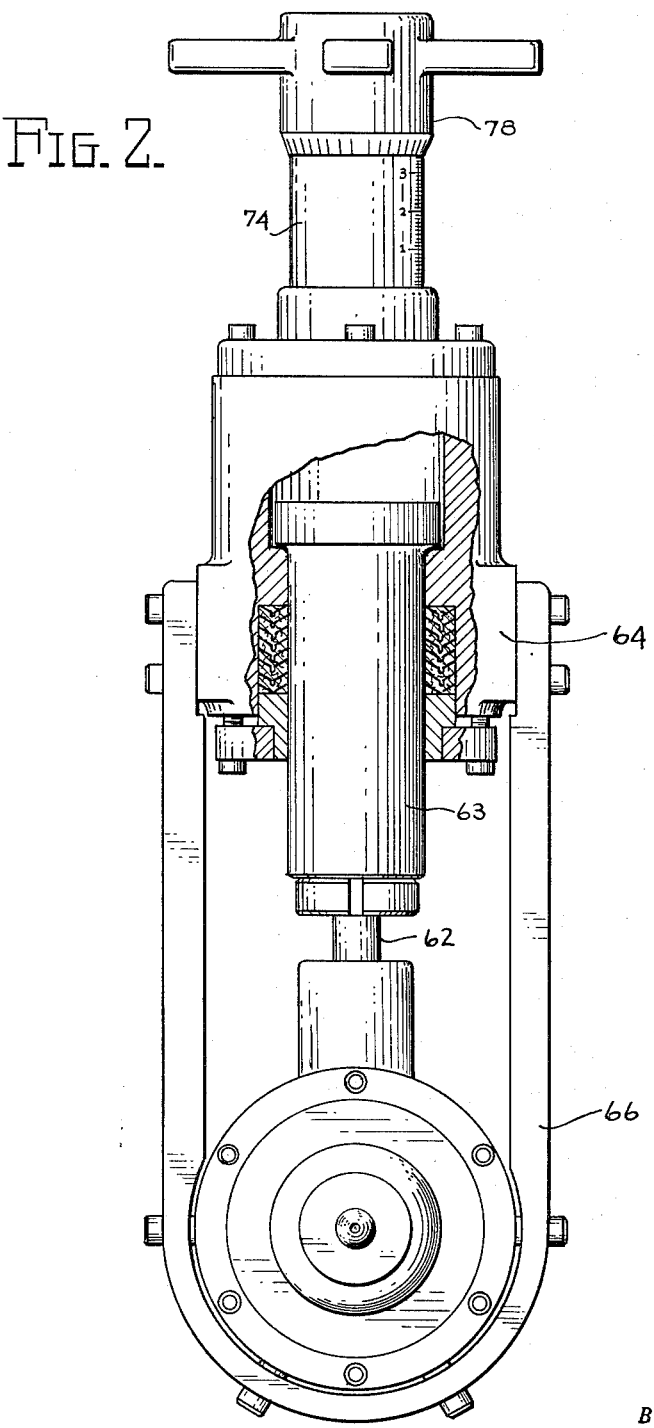
FIG. 2 is a fragmentary sectional view taken on line 2—2 of FIG. 1.

A machine embodying the present invention and capable of carrying out my new method is shown in its general configuration in FIG. 1. As there indicated, the machine comprises a base 10 on which a conventional die closing and clamping cylinder 12 is mounted. At the opposite end, an advancing cylinder 14 is provided which is adapted to move a heated plasticizing chamber 16 towards the die space in the usual manner. A charging cylinder 18 actuates a charging plunger 20 in the usual manner, and acts to force granular molding material from the usual radial passage 21 communicating with a supply hopper 22 into the plasticizing chamber 16. Within the chamber 16, the granular material passes around a torpedo 24 which forms, with the heated walls of the chamber, a series of axial passages having a large total area exposed to the heated surfaces of the chamber. These axial passages terminate at the end of the torpedo in a single discharge orifice 26. Such structure, insofar as the present invention is concerned, is conventional. In most conventional machines, the discharge orifice 26 of the plasticizing chamber leads directly to an injection nozzle which is brought into registry with the sprue opening of a die. Thus material is forced through the chamber and into the die at each stroke of the plunger 20.

Figure 4:
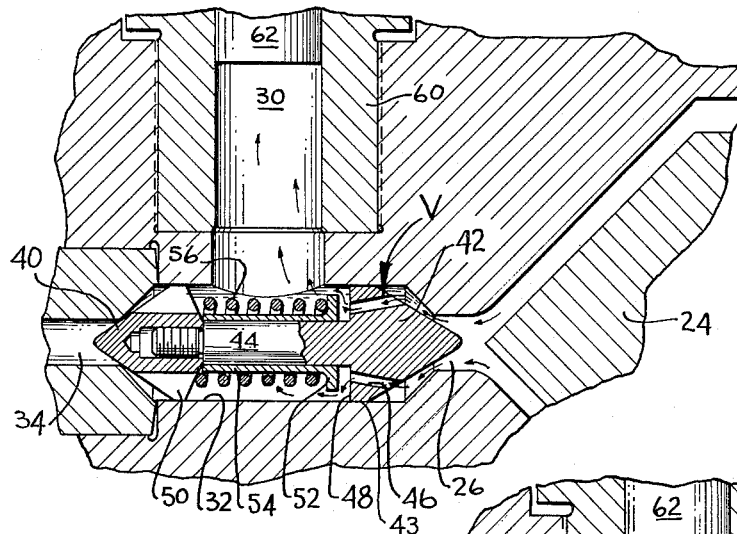
FIGS. 4, 5 and 6 are fragmentary vertical sectional views showing the control valve of the present invention in its several operating positions.
Figure 5:
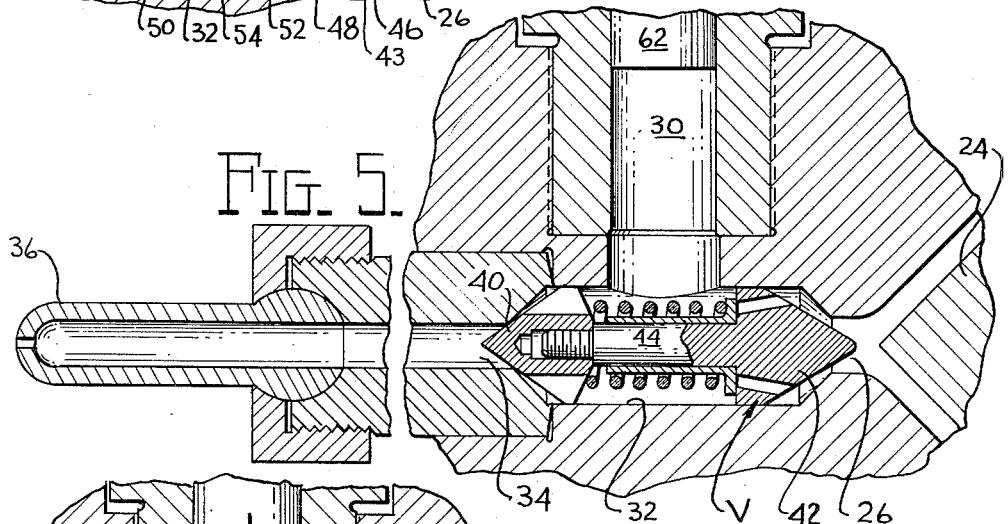
Figure 6:
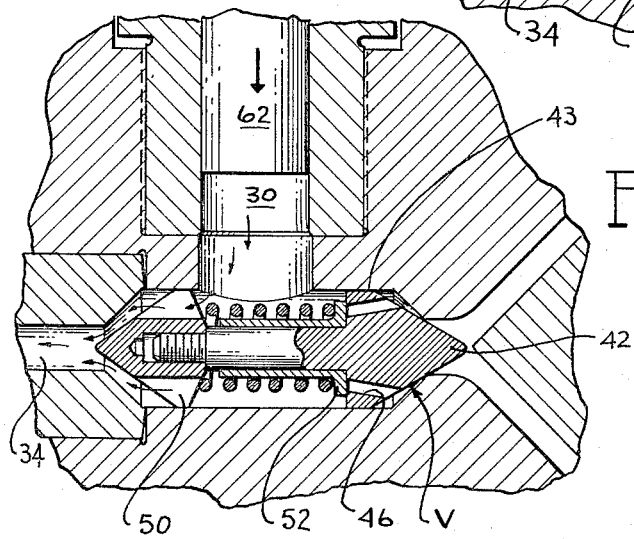

Ahead of the plasticizing chamber 16, in the present machine, is a material metering chamber 30 extending laterally away from the axis of the torpedo and its associated charging plunger. As shown in FIGS. 4 to 6, the discharge orifice 26 is in controlled communication with the material metering cylinder 30 through a valve chamber 32. At its opposite end of the chamber 32 is provided with a valved discharge passage 34 which leads to an injection nozzle 36. The nozzle is of conventional form and seats in the usual manner in a stationary die half (not shown) which cooperates with a movable die half in a manner well known in the art.

The present invention centers around the construction and operation of the metering cylinder 30 and the valve which controls the flow of plasticized material from the outlet orifice 26 of the heating chamber, into the metering cylinder, and out of the metering cylinder into the passage 34 leading to the injection nozzle 36.

As best shown in FIGS. 4 to 6 the valve which is designated generally V in FIGS. 4, 5 and 6 comprises spaced conical valve heads 40 and 42 carried at the ends of a stem 44. The valve heads, when seated, close respectively the orifice 26 leading from the heating chamber, and the passage 34 leading to the injection nozzle. Thus the head 42 may be referred to as an inlet valve for the cylinder 30 and the head 40 is a discharge valve for this metering cylinder. The head 42 has a cylindrical portion 43 which fits closely within the bore of the valve chamber 32 so that no material can flow around it, and this head is provided with a plurality of axial passages 46 leading from the conical face of the valve head to a flat valve seat 48 formed on the rear side of the head. The passages 46 commence at a point so far removed from the effective conical seating surface of the head that closing of the head against its seat closes all possibility of flow into the axial passages 46 as shown in FIG. 6.

Discharge valve head 40 is provided with a series of radial guiding extensions 50 which fit in the bore of the valve chamber 32 and center the valve with respect to the discharge end of the valve chamber.

A plate-like check valve 52 is formed on or attached to the head of a tubular sleeve 54 fitting over the valve stem 44 and is disposed for axial sliding movement relative thereto. The valve cooperates with the face 48 of the valve head 42 and is of a diameter to cover the openings of all of the axial passages 46. A spring 56 urges the valve 52 to closed position, the spring bearing against the opposite valve head 40 in the form shown.

The metering chamber 30 is formed in an injection cylinder 60 which is removably inserted into the body in which the valve chamber 32 is formed. The metering chamber contains an injection plunger 62 which extends out of its cylinder into abutting contact with an injection and metering ram 63 working in a cylinder 64. The cylinder 64 is carried by a U-shaped yoke 66 which partially surrounds the valve chamber body and which is fastened to the body of the cylinder 64.

The ram 63 is moved into its cylinder by the force exerted on the plunger 60 during the filling of the metering chamber 30, as will be fully explained hereinafter. The extent of the movement of the ram will obviously determine the capacity of the chamber 30, and the present invention includes means to make this determination with a high degree of accuracy. At its outer end, the ram 63 abuts an adjustable stop member 70 which can be screwed in or out by means of a threaded end portion 71 coacting with threads 72 formed in an upward extension 74 of the head of cylinder 64. Suitable handles 76 are provided to turn the adjusting screw, and a skirt 78 depends around the cylindrical head extension 74, which thus coacts with the skirt in the manner of a micrometer barrel and can be calibrated in units indicating the cubic capacity of the chamber 30 or in any other desired units such as the weight of the material segregated in the metering chamber. As the adjustable stop 70 is screwed into the cylinder 64, the extent to which the ram 63 and plunger 62 can move upwardly (in FIG. 3) becomes more limited, and the smaller will be the volume and weight of material accumulated in the chamber 30.

Ram 63 forms a differential area piston within the cylinder 64, so that fluid pressure introduced into the cylinder through a side inlet conduit 79 will force the ram out of the cylinder. Suitable packing 80 held by a retainer plate 82 and bolts 84 permit relatively high fluid pressures to be used in the cylinder 64.

The hydraulic and electrical control system for the machine embodying the present invention is largely conventional and has not been shown in detail in the drawings. FIGURE 7, however, is a diagrammatic showing of a control system which interrelates the application of fluid pressure to the metering and injection cylinder 64 to the rearward movement or withdrawal of the charging plunger 20 by the introduction of fluid pressure into the opposite ends of the charging cylinder 18. Any suitable device may be used for this purpose, and the drawings show only a diagrammatically indicated 4-way valve 86, appropriately connected.

The valve 86 is arranged to take power fluid from a pump 88 through a line 90 and is also connected to a sump 92 from which the pump draws its fluid and to which the respective cylinders 18 and 64 are connected by the valve when at discharge pressure. With the valve in the position shown in FIG. 7 fluid from pump 88 passes from line 90 to a line 94 to the rear of cylinder 18 driving the charging ram forwardly. At the same time the valve establishes a connection to a line 96 which has two parallel branches. Line 96 runs to the injection ram cylinder 64 through a throttle valve 98 and the side connection to the cylinder which has been designated 78. It also runs through a line 100 to the front end of the charging cylinder 18. Thus lines 96 and 100 are connected to discharge to the sump 92 whenever the valve directs power fluid from the pump 88 to the rear of the charging cylinder 18.

If the valve 86 is rotated 90 degrees in a clockwise direction, power fluid from the pump enters line 96 and 100 from line 90 and line 94 is then connected to discharge. Under this condition the power fluid in the front of the charging cylinder 18 retracts the plunger 20 and at the same time the ram 63 is driven out of its cylinder 64 at a rate determined by the throttle valve 98.

Figure 3:
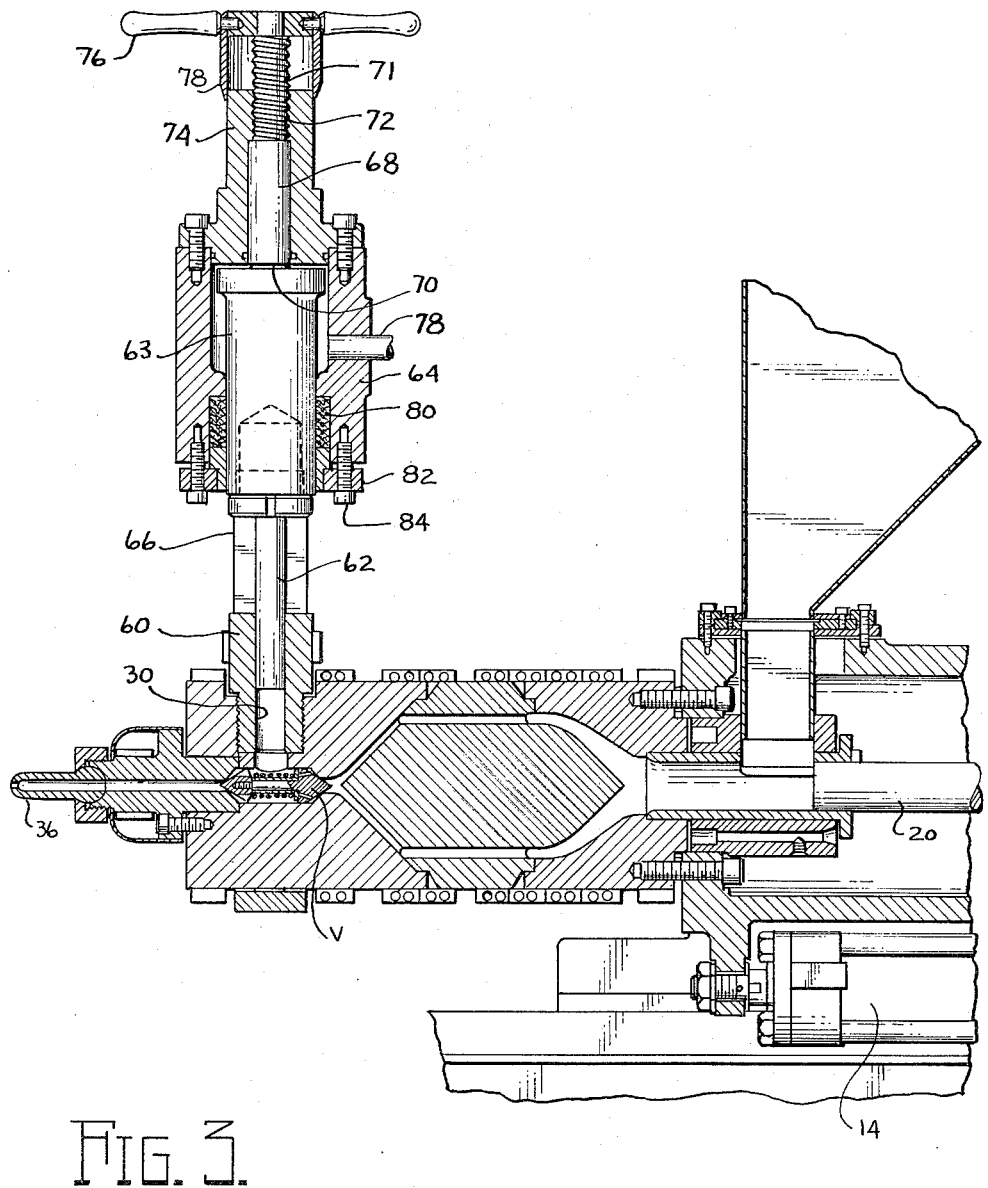
FIG. 3 is a central vertical sectional view of a portion of the machine showing the charging, metering and injection systems.

In operation, assuming that the heating and plasticizing chamber 16 is heated and has been suitably supplied with material from the supply hopper 22 by the charging plunger 20, the injection nozzle 36 is brought into registry with the sprue opening of the stationary half of the die in the usual manner by operation of the advancing cylinder 14. Assuming, also, that the movable half of the die is closed by the clamping cylinder 12, the parts are then ready for a shot of plasticized material. At this time valve 86 is in the position in which the pressure is being applied to the rear of cylinder 18 so that the charging plunger is moving forwardly, and the injection ram cylinder 64 is connected to discharge. As indicated in FIG. 3, the plasticized molding material is flowing from the heating chamber 16 through orifice 26 into the valve chamber 32 and the metering chamber 30.

The flow of plasticized material continues into the metering chamber and causes the outward displacement of the plunger 62 and the ram 63. Since the cylinder 64 is connected to discharge at this time, there is little or no resistance to the movement of the plunger and ram. However, as soon as ram 63 abuts against the adjustable stop 70, the pressure in the metering chamber 30 builds up to the full pressure on the charging ram 20 and further flow of material ceases. The pressure on each side of the plate valve 52 is thus equalized and this plate valve moves to closed position under the influence of its actuating spring 56. This position of the valve V is shown in FIG. 5. A precisely known volume and weight of plasticized material has now been segregated in the metering chamber 30.

The cycle continues with automatic or manual operation of the control valve 86 from the position in which power fluid acts on the rear of the charging plunger 20 to the position in which power fluid acts on the front of this plunger and also enters cylinder 64 through lines 96, 100 and 79 and the throttle valve 98. As soon as pressure is released on the charging plunger by the connection of the front of the charging cylinder 18 to discharge, pressure is applied on the injection plunger 62, the valve V moves to the position shown in FIG. 6 in which inlet orifice 26 is closed by valve head 42 and the discharge passage 34 is open. This valve movement takes place by reason of the pressure differential at orifice 26 which has low pressure on the inlet side adjacent the torpedo 24 and high pressure on the side that is disposed in the valve chamber 32. While the same pressure difference may exist on the opposite sides of the valve head 40, by reason of passage 34 standing at low pressure, movement in the desired direction is obtained by making the projected area of the cylindrical portion 43 of head 42 larger than the discharge passage 34. Thus a biasing pressure is established on the valve V tending to move it to the position in which the inlet orifice 26 is firmly closed and the outlet orifice to passage 34 is opened.

When the valve V has moved to open the discharge passage 34 the measured weight and volume of plasticized material that has been previously accumulated in the chamber 30 is injected into the nozzle and mold by plunger 62 making an inward stroke into the chamber 30. The volume entering the mold will be identical to the volume segregated in the metering chamber 30. The pressure of the injection is controlled by the pressure on ram 63 and the rate of injection is controlled by throttle 98. Injection continues until ram 63 bottoms in its cylinder 64. The dies may thereafter be opened, the part ejected, and the die reclosed for the next shot.

While a part is cooling and being ejected from the dies, the valve V is moved from the position in which the metering chamber 30 is connected to the discharge passage into the position where the discharge passage is closed by the application of pressure to the charging ram 20 on the next cycle of operation. This pressure is transmitted through the inlet orifice 26 and acts against the face of the valve head 42 to push the valve away from the inlet orifice. This motion of the valve is permitted by reason of the fact that the metering chamber and discharge orifice are both at exhaust pressure since the 4-way valve 86 has been moved to release the pressure in the cylinder 64.

It will be seen that the operation of the valve V is completely automatic and is accomplished without connection to the outside. Such a self-contained arrangement of the valve makes it possible to meter a precise quantity of material into chamber 30 and to predetermine this quantity by controlling the extent to which the ram 63 is permitted to enter its cylinder 64 by the adjustment of the stop 70. By injecting the exact quantity of material required to fill the die, and by continuing the injection until the ram 63 bottoms in its cylinder, the injected material is under pressure only when filling the die cavity. Thus the weight of the molded piece is very closely controlled, and the clamping cylinder pressure can be made much less than is required in conventional machines.

While the invention has been shown and described in conjunction with an injection molding machine of a specific type, it should be expressly understood that such disclosure is only illustrative, and that various modifications and changes can be made without departing from the spirit and scope of the appended claims.

What I claim is:

1. In a machine for the injection molding of plastic material having a frame, means movable on said frame to support a mold in position to receive an injected charge of molding material, a charging plunger, a heated plasticizing chamber, means to supply material to said plasticizing chamber, and means to operate said charging plunger to force material into, through and out of said plasticizing chamber, the improvement comprising, a valve chamber carried ahead of said plasticizing chamber, an inlet passage between said plasticizing chamber and said valve chamber, a discharge passage leading from said valve chamber to a nozzle and said mold, a metering chamber in constant open communication with said valve chamber, means to force a precise predetermined quantity of material from said metering chamber through said valve chamber and discharge passage into said mold, and valve means within said valve chamber operable solely by the application and release of fluid pressures imparted to the plasticized material, said valve means including a member shiftable from a first position wherein said inlet passage is open and said discharge passage is closed to a second position wherein said inlet passage is closed and said discharge passage is open, and a second movable member for selectively opening and closing said inlet passage when said first movable member is in said first position.

2. In a machine for the injection molding of plastic material having a frame, means movable on said frame to support a mold in position to receive an injected charge of molding material, a charging plunger, a heated plasticizing chamber, means to supply material to said plasticizing chamber, and means to operate said charging plunger to force material into, through and out of said plasticizing chamber, the improvement comprising, a metering chamber carried ahead of said plasticizing chamber, an inlet passage between said plasticizing chamber and said metering chamber, a discharge passage leading from said metering chamber to a nozzle and said mold, injection means to force a precise predetermined amount of material from said metering chamber through said discharge passage into said mold, and valve means between said inlet passage and said discharge passage in constant open communication with said metering chamber, said valve means including a first member operative to close said discharge passage and to open said inlet passage in a first position and to open said discharge passage and close said inlet passage in a second position, and a second member for selectively opening and closing said inlet passage when said first member is in said first position, said first member being moved to the first position by the application of pressure to the charging plunger, said second member being biased to close said inlet passage at least when the flow of plasticized material through said inlet orifice ceases, and said first member being moved to the second position by the application of pressure to said injection means.

3. The improvement defined in claim 2 and means to alter the volume of said metering chamber, said means being operative while the machine is in operation.

4. The improvement defined in claim 2 in which said injection means comprises a plunger having an end in said metering chamber and movable out of said chamber by the pressure of entering plasticized molding material, and means to vary the extent of outward movement of said plunger to alter the volume of said metering chamber.

5. The improvement defined in claim 2 in which said first member comprises spaced heads carried on opposed ends of a stem, one of said heads and said second member comprising series check valves in said inlet passage opened by pressure imposed by said charging plunger, and resilient means to close said second member upon release of such pressure.

6. The improvement defined in claim 5 in which said one of said heads in said inlet passage is closed by pressure imparted by said injection means to force material out of said metering chamber into said discharge passage and mold.

References Cited in the file of this patent

UNITED STATES PATENTS

| | | |
|---|---|---|
| 2,465,580 | Ernst et al. | Mar. 29, 1949 |
| 2,465,889 | Lester et al. | Mar. 29, 1949 |
| 2,706,487 | Wilson | Apr. 19, 1955 |
| 2,831,214 | Eyles et al. | Apr. 22, 1958 |